United States Patent
Wong et al.

(10) Patent No.: US 12,207,352 B2
(45) Date of Patent: *Jan. 21, 2025

(54) RECEIVE OPERATION MODE INDICATION FOR POWER SAVE

(71) Applicant: Apple Inc., Cupertino, CA (US)

(72) Inventors: Chiu Ngok E. Wong, San Jose, CA (US); Christiaan A. Hartman, San Jose, CA (US); Zheng Zeng, Mountain View, CA (US); Joonsuk Kim, Saratoga, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,877

(22) Filed: Dec. 7, 2023

(65) Prior Publication Data
US 2024/0298165 A1    Sep. 5, 2024

Related U.S. Application Data

(63) Continuation of application No. 17/571,304, filed on Jan. 7, 2022, now Pat. No. 11,877,348, which is a
(Continued)

(51) Int. Cl.
*H04W 8/18* (2009.01)
*H04L 69/22* (2022.01)
(Continued)

(52) U.S. Cl.
CPC ............. *H04W 8/183* (2013.01); *H04L 69/22* (2013.01); *H04W 52/0216* (2013.01); *H04W 84/12* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 7,881,755 | B1 | 2/2011 | Mishra |
| 8,811,426 | B1 | 8/2014 | Banerjea |

(Continued)

FOREIGN PATENT DOCUMENTS

| | | |
|---|---|---|
| CN | 1825779 | 8/2006 |
| CN | 102687422 | 9/2012 |

(Continued)

OTHER PUBLICATIONS

First Office Action for CN Patent Application No. 201910873199.1; Sep. 30, 2021.

(Continued)

*Primary Examiner* — Srinivasa R Reddivalam
(74) *Attorney, Agent, or Firm* — Kowert, Hood, Munyon, Rankin & Goetzel, P.C.

(57) ABSTRACT

Embodiments described herein relate to a system and method for providing flexible receiver configuration in wireless communication systems, such as 802.11 WLAN systems. In one embodiment, a wireless device may transmit a first data frame including first configuration information specifying a first configuration of the receiver to notify a remote device that the wireless device intends to configure its receiver according to the first configuration. After receiving an acknowledgement frame confirming the first configuration information, the wireless device may configure the receiver according to the first configuration. In another embodiment, a wireless device may receive a first data frame including first configuration information and further including a request that the wireless device configure its receiver according to the first configuration. In response, the wireless device may configure the receiver according to the first
(Continued)

configuration. In either case, the wireless device may receive subsequent communications according to the first configuration.

20 Claims, 7 Drawing Sheets

Related U.S. Application Data continuation of application No. 14/794,011, filed on Jul. 8, 2015, now Pat. No. 11,252,555.

(60) Provisional application No. 62/023,690, filed on Jul. 11, 2014.

(51) Int. Cl.
*H04W 52/02* (2009.01)
*H04W 84/12* (2009.01)

(56) References Cited

U.S. PATENT DOCUMENTS

| | | | |
|---|---|---|---|
| 9,351,247 B1 | 5/2016 | Mishra | |
| 2006/0056316 A1 | 3/2006 | Chandra | |
| 2006/0171482 A1 | 8/2006 | Trachewsky | |
| 2006/0187852 A1 | 8/2006 | Kwon | |
| 2008/0198763 A1 | 8/2008 | Fischer | |
| 2010/0118720 A1* | 5/2010 | Gauvreau | H04W 72/21 370/252 |
| 2010/0310002 A1 | 12/2010 | Lauer | |
| 2011/0029677 A1* | 2/2011 | Altmann | H04L 1/1607 380/42 |
| 2012/0087269 A1 | 4/2012 | Hussein | |
| 2012/0099497 A1 | 4/2012 | Vaidya | |
| 2012/0236771 A1* | 9/2012 | Luo | H04L 1/1861 370/329 |
| 2013/0016639 A1* | 1/2013 | Xu | H04W 24/08 370/329 |
| 2013/0016709 A1 | 1/2013 | Trachewsky | |
| 2013/0148611 A1 | 6/2013 | Moulsley | |
| 2014/0241446 A1 | 8/2014 | Zhang | |
| 2014/0307602 A1 | 10/2014 | Seok | |
| 2015/0208286 A1* | 7/2015 | Ozturk | H04W 36/14 370/331 |
| 2015/0327324 A1 | 11/2015 | Wei | |

FOREIGN PATENT DOCUMENTS

| | | |
|---|---|---|
| CN | 103348742 | 10/2013 |
| EP | 2056543 | 5/2009 |
| EP | 2869653 | 5/2015 |
| WO | 2013115464 | 8/2013 |
| WO | 2014003463 | 1/2014 |

OTHER PUBLICATIONS

Office Action for CN Patent Application No. 201510404214.X; Apr. 24, 2018.
Extended European Search Report for EP Patent Application No. 15176216.8; Nov. 25, 2015.
Communication pursuant to Article 94(3) EPC for EP Application No. 17202051.3, Nov. 9, 2018.

\* cited by examiner

RECEIVE OPERATION MODE INDICATION FOR POWER SAVE

PRIORITY INFORMATION

This application is a continuation of U.S. patent application Ser. No. 17/571,304 entitled "Receive Operation Mode Indication for Power Save", filed Jan. 7, 2022, which is a continuation of U.S. patent application Ser. No. 14/794,011, entitled "Receive Operation Mode Indication for Power Save", filed Jul. 8, 2015, now U.S. Pat. No. 11,252,555, issued on Feb. 15, 2022, which claims priority to U.S. Provisional Patent Application Ser. No. 62/023,690, entitled "Receive Operation Mode Indication for Power Save," filed Jul. 11, 2014, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to providing improved power management in Wireless LAN systems.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard and are marketed under the Wi-Fi brand name. WLAN networks link one or more devices to a wireless access point, which in turn provides connectivity to the wider Internet.

In 802.11 systems, devices that wirelessly connect to each other are referred to as "stations" or STA for short. Wireless stations can be either wireless access points or clients. Access points (APs), also referred to as wireless routers, act as base stations for the wireless network. APs transmit and receive radio frequency signals for communication with wireless client devices. APs also typically couple to the Internet in a wired fashion. Wireless clients operating on an 802.11 network can be any of various devices such as laptops, tablet devices, smart phones, or fixed devices such as desktop computers. Wireless client devices are referred to herein as stations, STA devices, or simply as "STA". Wireless client devices are also referred to herein as mobile devices.

Since in most instances the devices communicating on a WLAN are mobile, battery-operated devices, power management is an important consideration. The IEEE 802.11 standards define a spatial multiplexing (SM) power save feature to allow a STA to operate with only one active receive chain for a significant portion of time for the purpose of power conservation. However, that feature suffers from several drawbacks, including poor media access control (MAC) efficiency due to required control frames, and inflexibility in configuring a receiver.

Therefore, improvements are desired in wireless communication systems. In particular, it would be desirable to provide improvements with respect to reduced power consumption and/or reduced latency in WLAN systems.

SUMMARY

Embodiments described herein relate to a system and method for providing flexible receiver configuration in wireless communication systems, such as 802.11 WLAN systems.

In some embodiments, a method for reconfiguring a receiver in a wireless device, such as a mobile device or an access point, is presented. The wireless device may transmit a first data frame. The first data frame may include first configuration information specifying a first configuration of the receiver. For example, the first configuration information may include at least one of an indication of a channel width of the receiver and an indication of a number of active receive spatial streams of the receiver. The first configuration information may, for example, be included in a header of the first data frame, such as a MAC header. The wireless device may receive a first acknowledgement frame according to a second configuration of the receiver. The first acknowledgement frame may confirm the first configuration information. For example, the first configuration information may be included in a header of the first acknowledgement frame, such as a MAC header. In response to the receiving the first acknowledgement frame, the wireless device may configure the receiver according to the first configuration. The wireless device may then receive a second data frame according to the first configuration.

The second data frame may, in some scenarios, include second configuration information specifying a third configuration of the receiver. The wireless device may transmit a second acknowledgement frame confirming the second configuration information. In response to the receiving the second data frame, the wireless device may configure the receiver according to the third configuration. The wireless device may then receive a third data frame according to the third configuration.

The first data frame may further include an indication that the first configuration information includes a notice from the wireless device that the receiver will be configured according to the first configuration. The second data frame may further include an indication that the second configuration information includes a request from a sender of the second data frame that the receiver be configured according to the third configuration.

In other embodiments, a wireless communication device is disclosed. The wireless communication device may include a radio, including a receiver, and a processing element operably coupled to the radio. The processing element may be configured to cause the wireless communication device to perform functions similar to the method steps summarized above.

In other embodiments, a non-transitory computer-readable memory medium is disclosed, the non-transitory computer-readable memory medium storing program instructions that, when executed at a wireless communication device, cause the wireless communication device to perform functions similar to the method steps summarized above.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
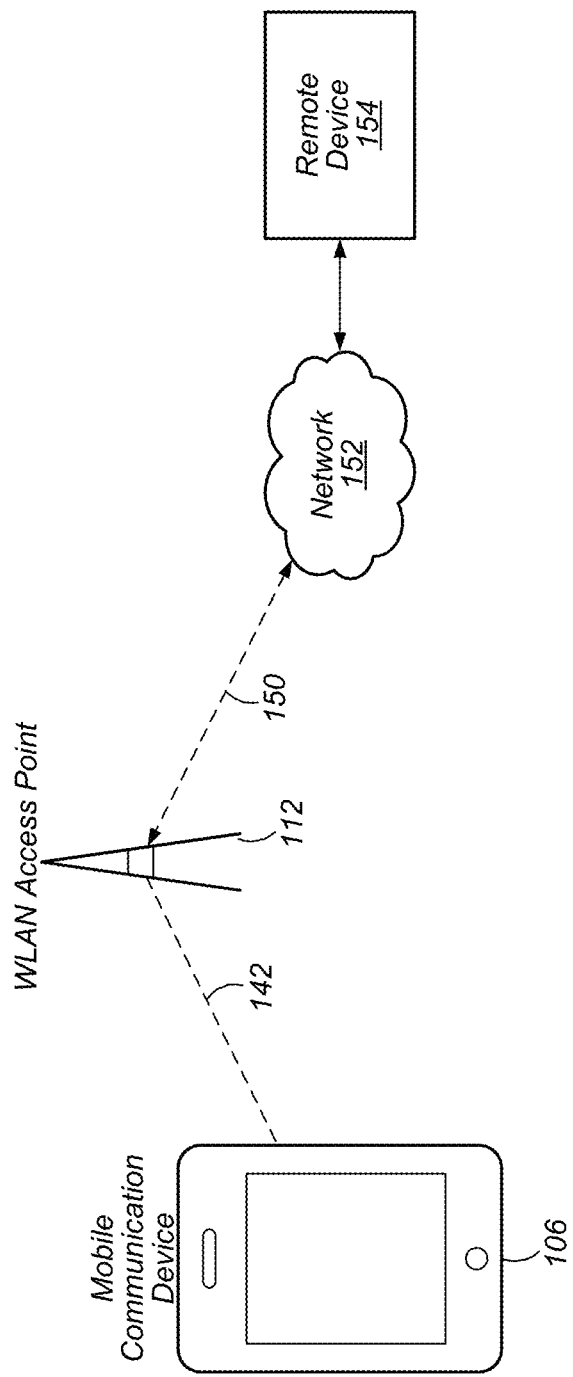
FIG. 1 illustrates an example WLAN communication system, according to some embodiments.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present disclosure.
AP: Access Point
A-PPDU: Aggregated PPDU
CW: Channel Width
MAC: Media Access Control
NSS: Number of Spatial Streams
PLCP: Physical Layer Convergence Protocol
PPDU: PLCP Protocol Data Unit
PSDU: PLCP Service Data Unit
RAT: Radio Access Technology
RX: Receive
RXCW: Receive Channel Width
RXMR: Receive Mode Request
RXNSS: Receive Number of Spatial Streams
RXOM: Receive Operating Mode
SM: Spatial Multiplexing
STA: Station device, such as a client mobile device
TX: Transmit
WLAN: Wireless Local Area Network Terms The following is a glossary of terms used in the present application:

Memory Medium-Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using WLAN communication. Examples of mobile devices include mobile telephones or smart phones (e.g., iPhone™, Android™-based phones), and tablet computers such as iPad, Samsung Galaxy, etc. Various other types of devices would fall into this category if they include both cellular and WiFi communication capabilities, such as laptop computers (e.g., MacBook), portable gaming devices (e.g., Nintendo DS™, PlayStation Portable™, Gameboy Advance™, iPhone™), portable Internet devices, and other handheld devices, as well as wearable devices such as wrist-watches, headphones, pendants, earpieces, etc. In general, the term "mobile device" can be broadly defined to encompass any electronic, computing, and/or telecommunications device (or combination of devices) which is easily transported by a user and capable of wireless communication using WLAN.

Wireless Device—any of various types of computer systems devices which performs wireless communications using WLAN communications. As used herein, the term "wireless device" may refer to a mobile device, as defined above, or to a stationary device, such as a wireless base station. For example, a wireless device may be any type of wireless station of an 802.11 system, such as an access point (AP) or a client station (STA).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—WLAN System

FIG. 1 illustrates an example WLAN system according to some embodiments. As shown, the exemplary WLAN system includes a mobile device 106 communicating over a wireless communication channel 142 with an Access Point (AP) 112. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another mobile device.

The WLAN system may be configured to operate according to any of various communications standards, such as the various IEEE 802.11 standards.

Figure 2:
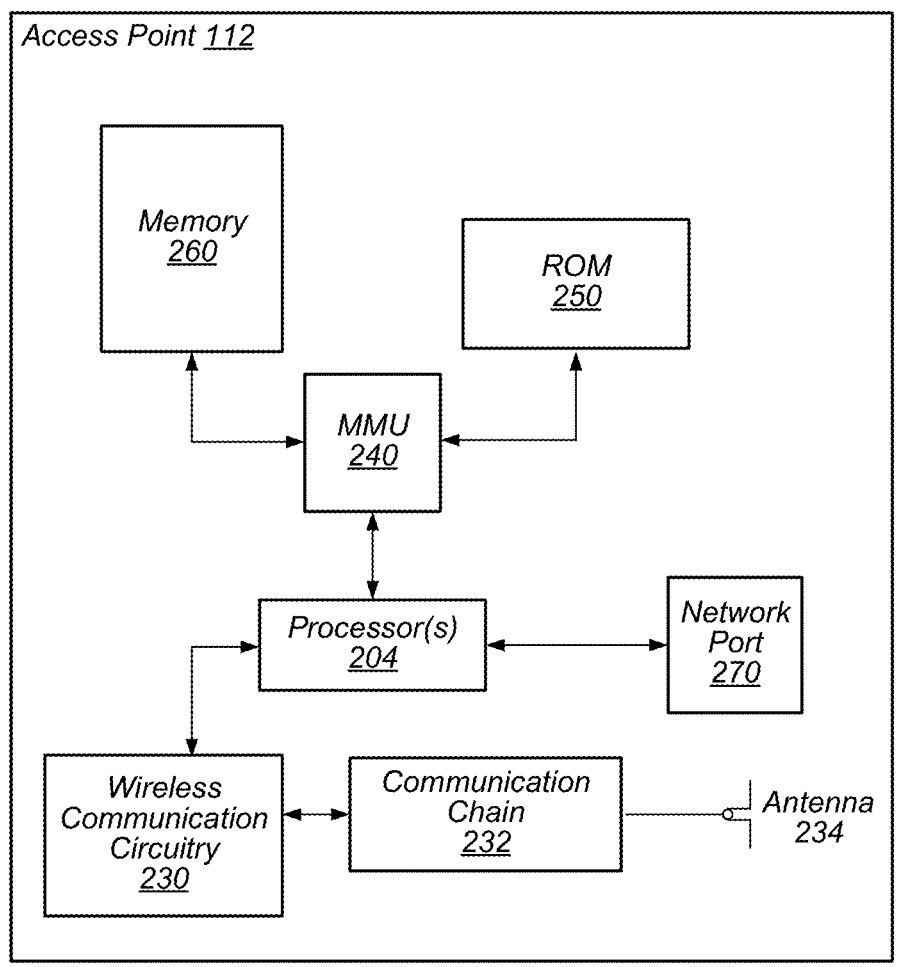
FIG. 2 illustrates an example simplified block diagram of a WLAN Access Point (AP), according to some embodiments.

FIG. 2—Access Point Block Diagram

FIG. 2 illustrates an exemplary block diagram of an Access Point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, the network port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry 230, which may include, e.g., a radio. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may be configured to communicate via various wireless communication technologies, including, but not limited to, LTE, LTE-A, GSM, WCDMA, CDMA2000, etc.

The AP 112 may be configured to implement part or all of the methods described herein, such as by reconfiguring a receiver included in the wireless communication circuitry 230 and/or the communication chain 232, or by requesting or accommodating reconfiguration of a receiver of a remote wireless device, such as the mobile device 106. For example, the processor(s) 204 of the AP 112 may be configured to implement part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof.

Figure 3:
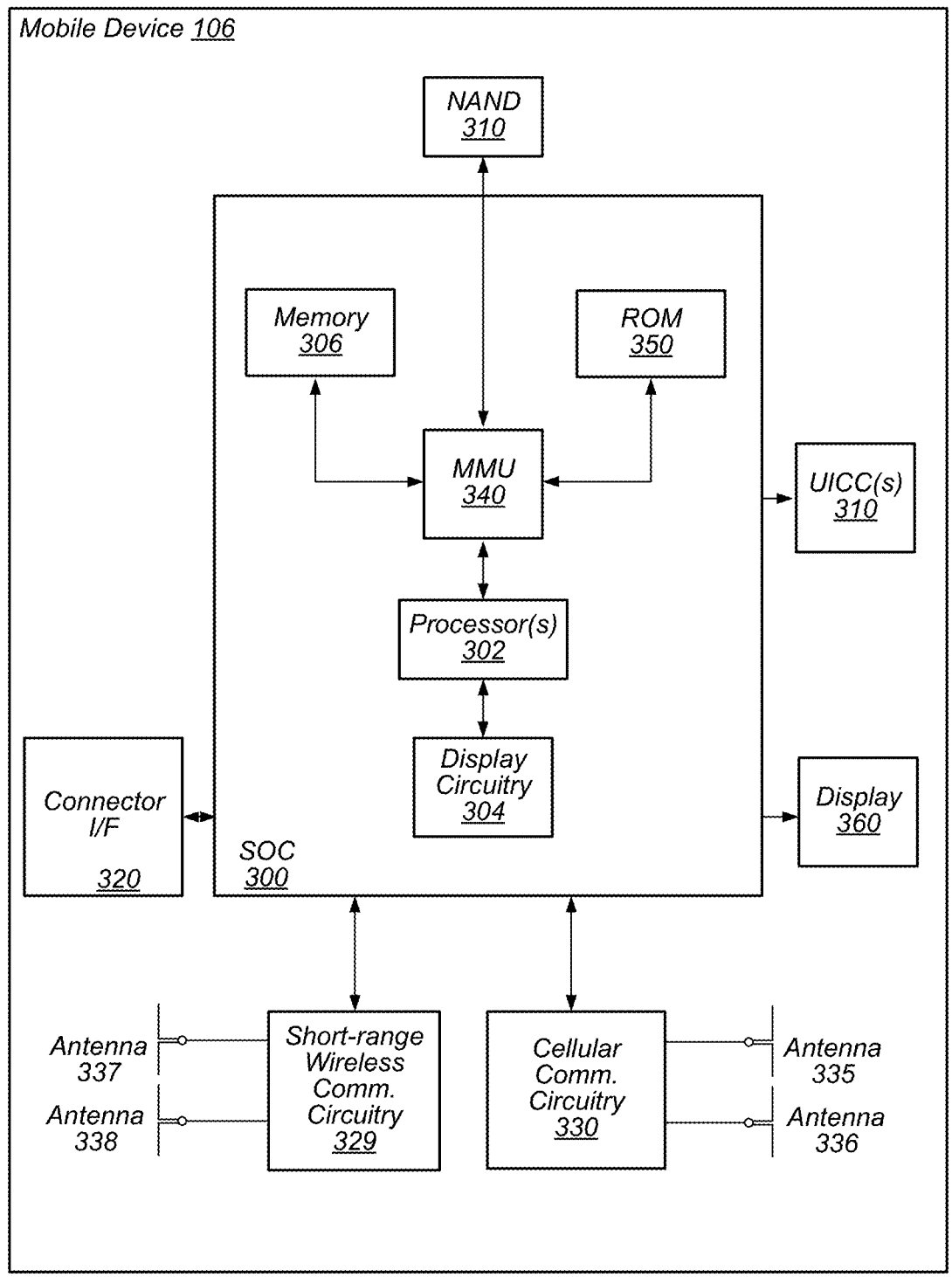
FIG. 3 illustrates an example simplified block diagram of a mobile device, according to some embodiments.

FIG. 3—Mobile Device Block Diagram

FIG. 3 illustrates an example simplified block diagram of a mobile device 106. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., Bluetooth™ and WLAN circuitry). The mobile device 106 may further include one or more smart cards 310 that include SIM (Subscriber Identity Module) functionality, such as one or more UICC(s) (Universal Integrated Circuit Card(s)) cards 310. The cellular communication circuitry 330 may couple to one or more antennas, such as antennas 335 and 336 as shown. The short range wireless communication circuitry 329 may also couple to one or more antennas, such as antennas 337 and 338 as shown. Alternatively, the short range wireless communication circuitry 329 may couple to the antennas 335 and 336 in addition to, or instead of, coupling to the antennas 337 and 338. The short range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the mobile device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the mobile device 106 may be configured to communicate wirelessly using one or more radio access technologies (RATs). The mobile device 106 may be configured to communicate according to a WLAN RAT for communication in a WLAN network, such as that shown in FIG. 1. The mobile device 106 may also be configured to communicate on other RATs, such as cellular RATs, as desired.

The mobile device 106 may include hardware and software components for implementing all of the methods described herein, such as by reconfiguring a receiver, e.g., included in the short range wireless communication circuitry 329, or by requesting or accommodating reconfiguration of a receiver of a remote wireless device, such as the mobile device AP 112. For example, the processor 302 of the mobile device 106 may be configured to implement part or all of the features described herein, e.g., by executing program instructions stored on a memory medium (e.g., a non-transitory computer-readable memory medium). Alternatively (or in addition), the processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 320, 330, 335, 340, 350, 360 may be configured to implement part or all of the features described herein.

As used herein, the term "mobile device" may refer to a device such as the mobile device 106 described above.

Figure 4A:
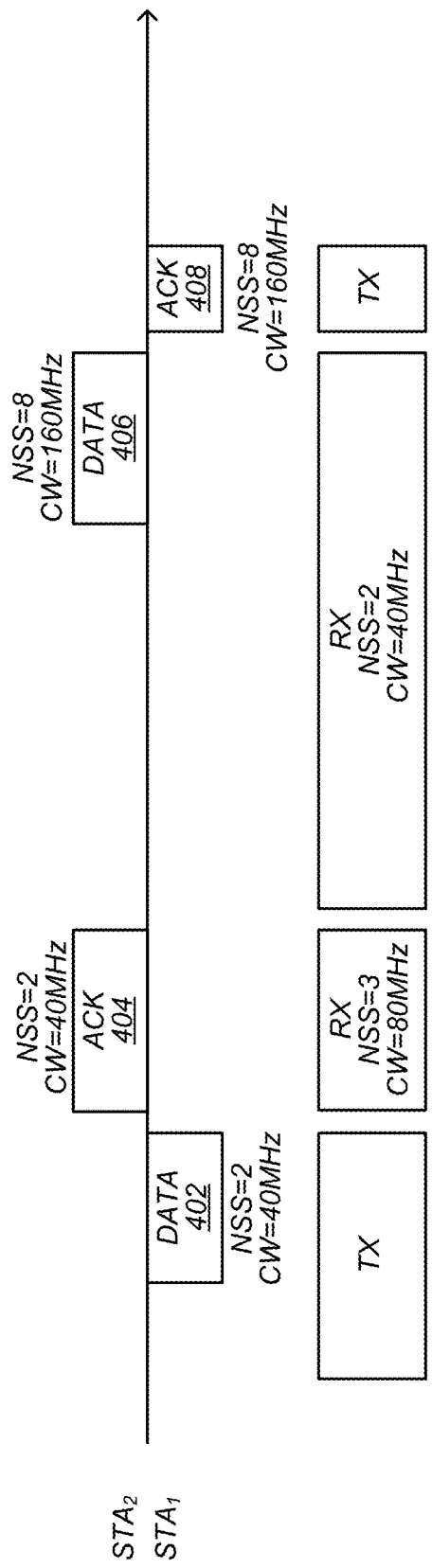
FIG. 4A illustrates a timeline demonstrating use by a wireless device of configuration information for signaling a configuration of its own receiver, according to some scenarios.
Figure 4B:
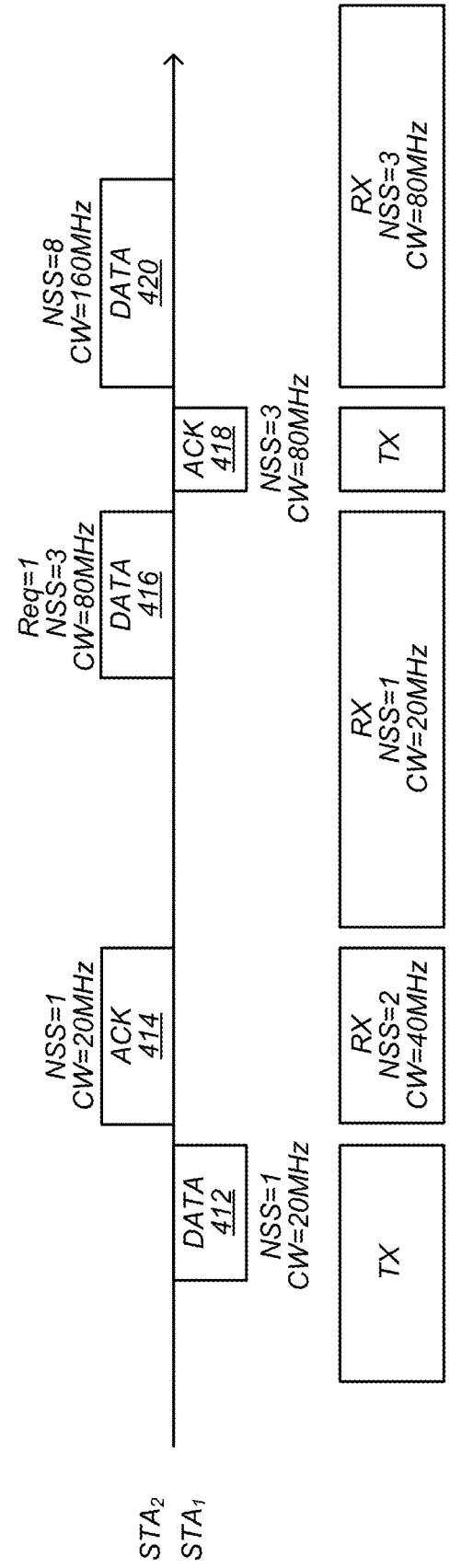
FIG. 4B illustrates a timeline demonstrating use by a wireless device of configuration information for signaling a configuration of a receiver of a remote wireless device, according to some scenarios.

FIGS. 4A-4B—Receiver-Initiated Receiver Configuration

A wireless device, such as the mobile device 106 or the access point 112, may configure its receiver to operate according to a plurality of configurations. For example, the wireless device may configure its receiver to operate with any of various channel widths. In some scenarios, the wireless device may select between channel widths of 20 MHz, 40 MHz, 80 MHz, or 160 MHz. As another example, the wireless device may configure its receiver to operate with any of various numbers of spatial streams. In some scenarios, the wireless device may select any integer number of spatial streams from 1 to 8. For example, this may be implemented by activating one receive chain for each of the selected number of spatial streams, while deactivating any remaining receive chains of the receiver. Thus, selecting a number of spatial streams may, in some cases, be synonymous with selecting a number of receive chains.

Selecting a smaller channel width and/or a lower number of spatial streams may allow a lower rate of power consumption by the receiver than selecting a larger channel width and/or a higher number of spatial streams. For example, selecting a lower number of spatial streams may allow hardware components of excess receive chains to be temporarily disabled. Thus, it may be preferable in some scenarios to select minimum configuration parameters sufficient to accommodate expected communication loads. Therefore, it may be advantageous to allow a wireless device to efficiently indicate to a remote device a preferred configuration of a receiver located either in the wireless device or in the remote device. For example, the preferred configuration may be based on information available to the wireless device regarding upcoming communication loads.

FIGS. 4A and 4B illustrate timelines demonstrating use by a wireless device of configuration information for signaling a configuration of a receiver, according to two scenarios. Each of the FIGS. 4A and 4B demonstrates possible behavior of two wireless stations ($STA_1$ and $STA_2$), as time progresses from left to right. A current state of $STA_1$ is shown below each timeline. It should be appreciated that the timelines of FIGS. 4A and 4B include only details relevant to the explanation of the present embodiment, and may omit other details. For example, in some scenarios, $STA_1$ may transition at various times to other states, such as a Listen state, which are not illustrated in FIGS. 4A and 4B.

Although the two wireless stations are discussed herein as client stations, this is not intended to be limiting, and it should be understood that the illustrated timelines may instead involve communications between other wireless stations, such as between a client station and an AP. For example, the illustrated timelines may be implemented in an identical fashion with an AP in place of $STA_1$ and/or $STA_2$. For example, the illustrated procedures may be implemented by two devices including one or more of the mobile device 106 and the access point 112.

FIG. 4A illustrates a timeline demonstrating use by a wireless device ($STA_1$) of configuration information for signaling a configuration of its own receiver, according to some scenarios. As shown in FIG. 4A, $STA_1$ may transmit to $STA_2$ a data frame 402, while in a TX mode. The data frame 402 may include configuration information specifying a configuration according to which $STA_1$ intends to configure its receiver. For example, the configuration information may include an indication of a channel width and/or an indication of a number of spatial streams. In such an example, the configuration information may indicate that $STA_1$ intends to configure its receiver so as to receive signals having a channel width not greater than the indicated channel width and having a number of spatial streams not greater than the indicated number of spatial streams.

As illustrated in the example of FIG. 4A, the data frame 402 includes configuration information including an indication of a channel width of 40 MHz and an indication of a number of spatial streams of 2.

After transmitting the data frame 402, STA$_1$ may transition to an RX state. However, STA$_1$ may defer configuration of its receiver according to the transmitted configuration information until after it receives a confirmation that STA$_2$ has received the configuration information. Therefore, when STA$_1$ enters the RX state, its receiver may be configured according to a previously negotiated configuration. As illustrated in the example of FIG. 4A, the receiver of STA$_1$ is configured to receive signals having a channel width not greater than 80 MHz and having a number of spatial streams not greater than 3.

In response to receiving the data frame 402, STA$_2$ may transmit an acknowledgement frame 404, which may confirm receipt by STA$_2$ of the configuration information included in the data frame 402. For example, the acknowledgement frame 404 may include the same configuration information as the data frame 402, to confirm that STA$_2$ received the configuration information correctly. The acknowledgement frame 404 may be configured to accommodate the configuration of the receiver of STA$_1$, according to the previously negotiated configuration. For example, as illustrated in the example of FIG. 4A, the acknowledgement frame 404 may have a channel width not greater than 80 MHz and may have a number of spatial streams not greater than 3.

In response to receiving the acknowledgement frame 404, STA$_1$ may configure its receiver according to the configuration specified by the configuration information included in the data frame 402. As illustrated in the example of FIG. 4A, STA$_1$ configures its receiver to receive signals having a channel width not greater than 40 MHz and having a number of spatial streams not greater than 2.

This configuration allows less communication traffic to be received in a fixed amount of time than the previous configuration. This transition may be performed, e.g., if STA$_1$ has information suggesting that RX traffic will be light, or if STA$_1$ has a need to conserve power. Thus, STA$_1$ may use information of which it is aware to efficiently configure its receiver in a configuration that may conserve power while still accommodating RX traffic.

While the receiver of STA$_1$ is configured according to the configuration specified by the configuration information included in the data frame 402, STA$_2$ may transmit to STA$_1$ a data frame 406. The data frame 406 may be configured to accommodate the configuration of the receiver of STA$_1$, as indicated by the configuration information included in the data frame 402. Specifically, the data frame 406 may have a channel width not greater than 40 MHz and may have a number of spatial streams not greater than 2. For example, the data frame 406 may have 2 spatial streams and a channel width of 40 MHz. As another example, the data frame 406 may have 1 spatial stream and a channel width of 20 MHz. More generally, any frames transmitted by STA$_2$ to STA$_1$ subsequent to the acknowledgement frame 404 may accommodate the configuration specified by the configuration information included in the data frame 402, until STA$_1$ and STA$_2$ negotiate a new configuration of the receiver of STA$_1$.

The data frame 406 may include configuration information specifying a configuration according to which STA$_2$ intends to configure its receiver. For example, the configuration information may have the same form as the configuration information included in the data frame 402. The configuration information included in the data frame 406 may be the same as or different than the configuration information included in the data frame 402. For example, STA$_2$ may intend to configure its receiver according to a different configuration than the receiver of STA$_1$. For example, STA$_2$ may expect to receive more communication from STA$_1$ than it expects to transmit to STA$_1$. As a specific example, STA$_2$ may be receiving a video stream from STA$_1$, and may therefore desire a channel width greater than 40 MHZ and/or a number of spatial streams greater than 2.

As illustrated in the example of FIG. 4A, the data frame 406 includes configuration information including an indication of a channel width of 160 MHz and an indication of a number of spatial streams of 8.

In response to receiving the data frame 406, STA$_1$ may transition to the TX state and transmit an acknowledgement frame 408. The acknowledgement frame 408 may confirm receipt by STA$_1$ of the configuration information included in the data frame 406. For example, the acknowledgement frame 408 may include the same configuration information as the data frame 406, to confirm that STA$_1$ received the configuration information correctly. The acknowledgement frame 408 may be configured to accommodate the configuration of the receiver of STA$_2$, according to a previously negotiated configuration.

In response to receiving the acknowledgement frame 408, STA$_2$ may configure its receiver according to the configuration specified by the configuration information included in the data frame 406. As illustrated in the example of FIG. 4A, STA$_2$ configures its receiver to receive signals having a channel width not greater than 160 MHz and having a number of spatial streams not greater than 8. Any frames transmitted by STA$_1$ to STA$_2$ subsequent to the acknowledgement frame 408 may accommodate the configuration specified by the configuration information included in the data frame 406, until STA$_1$ and STA$_2$ negotiate a new configuration of the receiver of STA$_2$.

FIG. 4B illustrates a timeline demonstrating use by a wireless device (STA$_2$) of configuration information for signaling a configuration of a receiver of a remote wireless device (STA$_1$), according to some scenarios. As shown in FIG. 4B, STA$_1$ may transmit to STA$_2$ a data frame 412, while in a TX mode. The data frame 412 may include configuration information specifying a configuration according to which STA$_1$ intends to configure its receiver. The data frame 412 may be similar to the data frame 402, as discussed above, and may include similar configuration information. As illustrated in the example of FIG. 4B, the data frame 412 includes configuration information including an indication of a channel width of 20 MHz and an indication of a number of spatial streams of 1.

After transmitting the data frame 412, STA$_1$ may transition to an RX state. However, STA$_1$ may defer configuration of its receiver according to the transmitted configuration information until after it receives a confirmation that STA$_2$ has received the configuration information. Therefore, when STA$_1$ enters the RX state, its receiver may be configured according to a previously negotiated configuration. As illustrated in the example of FIG. 4B, the receiver of STA$_1$ is configured to receive signals having a channel width not greater than 40 MHz and having a number of spatial streams not greater than 2.

In response to receiving the data frame 412, STA$_2$ may transmit an acknowledgement frame 414, which may confirm receipt by STA$_2$ of the configuration information included in the data frame 412. The acknowledgement frame 414 may be similar to the acknowledgement frame 404, as discussed above, and may include a similar confirmation of configuration information. The acknowledgement frame 414 may be configured to accommodate the configuration of the receiver of STA$_1$, according to the previously negotiated configuration. Specifically, the acknowledgement frame 414 may have a channel width not greater than 40 MHz and may have a number of spatial streams not greater than 2.

In response to receiving the acknowledgement frame 414, $STA_1$ may configure its receiver according to the configuration specified by the configuration information included in the data frame 412. As illustrated in the example of FIG. 4B, $STA_1$ configures its receiver to receive signals having a channel width not greater than 20 MHz and having a number of spatial streams not greater than 1.

While the receiver of $STA_1$ is configured according to the configuration specified by the configuration information included in the data frame 412, $STA_2$ may transmit to $STA_1$ a data frame 416. The data frame 416 may be configured to accommodate the configuration of the receiver of $STA_1$, as indicated by the configuration information included in the data frame 412. Specifically, the data frame 416 may have a channel width not greater than 20 MHz and may have a number of spatial streams not greater than 1. More generally, any frames transmitted by $STA_2$ to $STA_1$ subsequent to the acknowledgement frame 414 may accommodate the configuration specified by the configuration information included in the data frame 412, until $STA_1$ and $STA_2$ negotiate a new configuration of the receiver of $STA_1$.

The data frame 416 may include a request for $STA_1$ to configure its receiver according to a new configuration. The data frame 416 may further include configuration information specifying the new configuration. For example, the configuration information specifying the new configuration may be in place of configuration information specifying a configuration according to which $STA_2$ intends to configure its receiver, as discussed in connection with the data frame 406 of FIG. 4A. Specifically, in some scenarios, the configuration information specifying the new configuration may be in the same or similar form as the configuration information included in the data frame 402.

The request by $STA_2$ for $STA_1$ to configure its receiver according to the new configuration may be based, e.g., on information available to $STA_2$ indicating an expected increase in communication traffic. For example, $STA_2$ may be aware that it is about to transmit a large amount of communication traffic to $STA_1$. In some scenarios, $STA_2$ may request that $STA_1$ configure its receiver according to the new configuration in response to determining that the current configuration of the receiver of $STA_1$ is insufficient to accommodate the volume of communication traffic to be sent by $STA_2$.

As illustrated in the example of FIG. 4B, the data frame 416 includes configuration information including an indication of a channel width of 80 MHz and an indication of a number of spatial streams of 3.

In response to receiving the data frame 416, $STA_1$ may transition to the TX state and transmit an acknowledgement frame 418. The acknowledgement frame 418 may confirm the request and/or the configuration information included in the data frame 416. For example, the acknowledgement frame 418 may include the same configuration information as the data frame 416, to confirm that $STA_1$ received the configuration information correctly. Alternatively, the acknowledgement frame 418 may not confirm the configuration information included in the data frame 416. For example, $STA_1$ may opt to not configure its receiver according to the new configuration specified by the data frame 416. In that case, the acknowledgement frame 418 may include other configuration information specifying another configuration according to which $STA_1$ does intend to configure its receiver. Such other configuration information may specify the current configuration of $STA_1$, or may specify a different configuration, such as a compromise configuration having parameters between those of the current configuration and those of the new configuration specified by the data frame 416. Alternatively, or in addition, the acknowledgement frame 418 may include an indicator of whether the configuration information included in the data frame 416 was accepted or denied, such as an acceptance bit. The acknowledgement frame 418 may be configured to accommodate the configuration of the receiver of $STA_2$, according to a previously negotiated configuration.

After transmitting the acknowledgement frame 418, $STA_1$ may transition to the RX state. In response to receiving the data frame 416, including the request and the configuration information, $STA_1$ may configure its receiver according to the new configuration specified by the configuration information. Alternatively, $STA_1$ may configure its receiver according to the configuration specified in the acknowledgement frame 418, which may match the new configuration specified by the data frame 416, or may include another configuration, as described above. As illustrated in the example of FIG. 4B, $STA_1$ configures its receiver to receive signals having a channel width not greater than 80 MHz and having a number of spatial streams not greater than 3, according to the new configuration specified by the data frame 416 and repeated by the acknowledgement frame 418.

While the receiver of $STA_1$ is configured according to the configuration specified by the configuration information included in the data frame 416 (or in the acknowledgement frame 418), $STA_2$ may transmit to $STA_1$ a data frame 420. The data frame 420 may be configured to accommodate the configuration of the receiver of $STA_1$, as indicated by the configuration information included in the data frame 416 (or in the acknowledgement frame 418). Specifically, the data frame 420 may have a channel width not greater than 80 MHz and may have a number of spatial streams not greater than 3. More generally, any frames transmitted by $STA_2$ to $STA_1$ subsequent to the acknowledgement frame 418 may accommodate the configuration specified by the configuration information included in the data frame 416 (or the acknowledgement frame 418), until $STA_1$ and $STA_2$ negotiate a new configuration of the receiver of $STA_1$.

The data frame 420 may include configuration information specifying a configuration according to which $STA_2$ intends to configure its receiver, as discussed in connection with the data frame 406 of FIG. 4A. In some scenarios, $STA_2$ may not intend to change the configuration of its receiver. In such scenarios, the configuration information included in the data frame 420 may specify a configuration identical to the current (e.g. most recently negotiated) configuration of the receiver of $STA_2$. As illustrated in the example of FIG. 4B, the data frame 420 includes configuration information including an indication of a channel width of 160 MHz and an indication of a number of spatial streams of 8.

According to some scenarios, the configuration information discussed in connection with FIGS. 4A and 4B may be included within a frame header. For example, in the timeline of FIG. 4A, the configuration information included in the data frame 406 may be included within a frame header of the data frame 406. Additionally, the request for a remote wireless device to reconfigure its receiver may also be included within the frame header. For example, in the timeline of FIG. 4B, both the request and the configuration information included in the data frame 416 may be included within a frame header of the data frame 416.

As a specific example, the request and configuration information may be included within a MAC header, such as the MAC headers defined by the 802.11 standards.

According to some scenarios, the MAC header may include an RX Operating Mode (RXOM) field. For example, the RXOM field may be a 1-byte field.

The RXOM field may include an RX Number of Spatial Streams (RXNSS) subfield indicating the maximum number of spatial streams to be received by the receiver. For example, the RXNSS subfield may be a 3-bit subfield indicating values 1-8.

The RXOM field may further include an RX Channel Width (RXCW) subfield indicating the channel width of the receiver. For example, the RXCW subfield may be a 3-bit subfield indicating a channel width of 20 MHz, 40 MHz, 80 MHz, or 160 MHz. If implemented as a subfield having 3 or more bits, the RXCW subfield may further be capable of indicating additional channel widths.

The RXOM field may further include an RX Mode Request (RXMR) subfield indicating to which receiver the RXOM field is directed. For example, the RXMR subfield may be a 1-bit subfield. In an exemplary scenario, if the RXMR subfield is set to 0, then the RXOM field may be directed to the receiver of the wireless device transmitting the RXOM field. I.e., if the RXMR subfield is set to 0, then the RXNSS subfield and the RXCW subfield may specify a configuration according to which the device transmitting the RXOM field intends to configure its receiver. If the RXMR subfield is set to 1, then the RXOM field may be directed to the receiver of the wireless device to which the frame containing the RXOM field is directed. I.e., if the RXMR subfield is set to 1, then the RXNSS subfield and the RXCW subfield may specify a configuration according to which the device receiving the RXOM field may configure its receiver. Specifically, the RXMR subfield set to 1 may act as a request for the receiving device to configure its receiver according to the configuration specified by the RXNSS subfield and the RXCW subfield.

For example, the timelines of FIGS. 4A and 4B may be implemented using the RXOM field, as follows.

In the timeline of FIG. 4A, the data frame 402 may include a MAC header including the RXOM field, as defined above. Specifically, the configuration information included in the data frame 402 may include the RXOM field. The RXCW subfield may be set to a value indicating a channel width of 40 MHz. The RXNSS subfield may be set to a value indicating a number of spatial streams of 2. The RXMR subfield may be set to 0, indicating that the RXOM field is directed to the receiver of $STA_1$. I.e., the RXMR subfield set to 0 may indicate that the configuration information specifies a configuration according to which $STA_1$ intends to configure its receiver. The acknowledgement frame 404 may also include a MAC header including the RXOM field, which may be set to the same values as the RXOM field included in the data frame 402. The data frame 406 may include a MAC header including the RXOM field, in which the RXCW subfield may be set to a value indicating a channel width of 160 MHz, the RXNSS subfield may be set to a value indicating a number of spatial streams of 8, and the RXMR subfield may be set to 0. The acknowledgement frame 408 may also include a MAC header including the RXOM field, which may be set to the same values as the RXOM field included in the data frame 406.

Similarly, in the timeline of FIG. 4B, the data frame 412 may include a MAC header including the RXOM field, in which the RXCW subfield may be set to a value indicating a channel width of 20 MHz, the RXNSS subfield may be set to a value indicating a number of spatial streams of 1, and the RXMR subfield may be set to 0. The acknowledgement frame 414 may also include a MAC header including the RXOM field, which may be set to the same values as the RXOM field included in the data frame 412. The data frame 416 may include a MAC header including the RXOM field, in which the RXCW subfield may be set to a value indicating a channel width of 80 MHz, the RXNSS subfield may be set to a value indicating a number of spatial streams of 3, and the RXMR subfield may be set to 1. Specifically, the RXMR subfield set to 1 may include the request for $STA_1$ to configure its receiver according to the new configuration. The acknowledgement frame 418 may also include a MAC header including the RXOM field, which may be set to the same values as the RXOM field included in the data frame 412. Alternatively, the RXMR subfield included in the acknowledgement frame 418 may be set to 0.

Figure 5A:
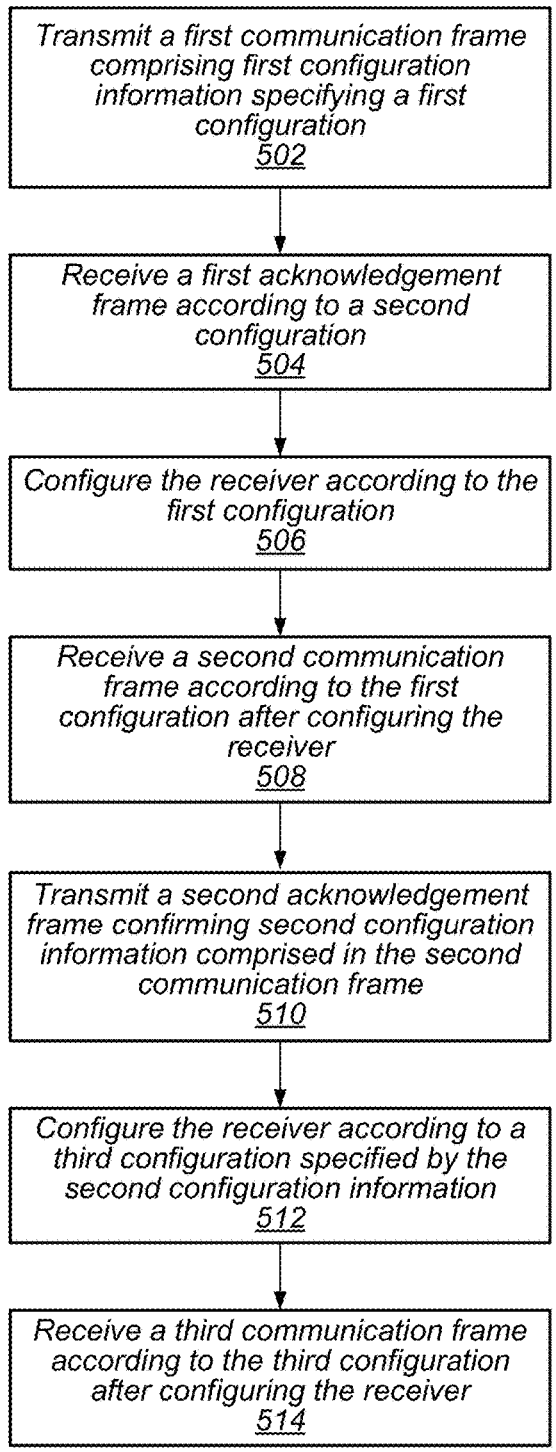
FIGS. 5A and 5B are flowchart diagrams illustrating exemplary methods for reconfiguring a receiver in a wireless device, according to some scenarios.
Figure 5B:
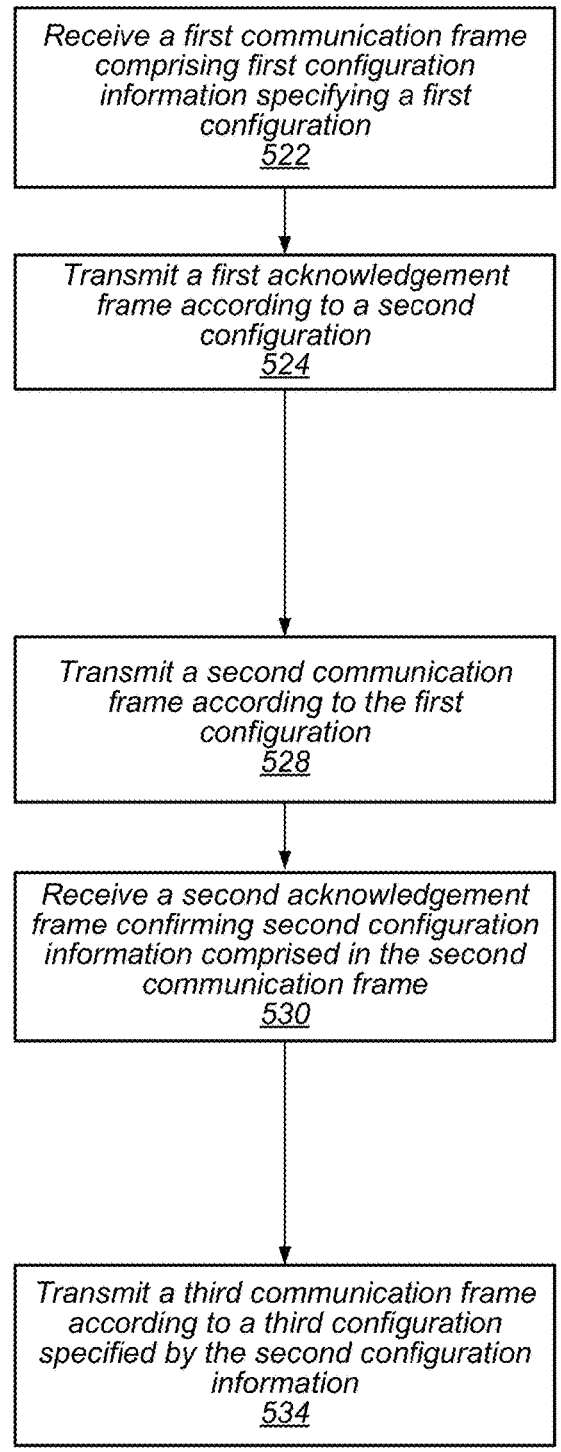

FIGS. 5A-5B—Methods for Receiver-Initiated Receiver Configuration

FIGS. 5A and 5B are flowchart diagrams illustrating exemplary methods for reconfiguring a receiver in a wireless device, according to two scenarios. The methods shown in FIGS. 5A and 5B may be used in conjunction with any of the computer systems or devices shown in the above Figures, among other devices. If desired, it may be the case that each of the methods is more particularly implemented by a wireless device, or, more specifically, by a WLAN/Wi-Fi chipset within a wireless device. Implementing some embodiments of the method of either of FIGS. 5A and 5B may result in communications according to the timeline of either FIG. 4A or FIG. 4B. Some of the method elements shown may be performed concurrently or in a different order than shown, or may be omitted. Additional method elements may also be performed as desired. As shown, the methods may operate as follows.

As shown in FIG. 5A, at 502, a wireless device, such as the mobile device 106 or the AP 112, may transmit a first communication frame. The first communication frame may include first configuration information specifying a first configuration of a receiver in the wireless device. For example, the first configuration information may include at least one of an indication of a channel width of the receiver and an indication of a number of active receive spatial streams of the receiver. The first configuration information may be included in a header of the first communication frame. Specifically, the first configuration information may be included in a MAC header of the first communication frame.

According to some embodiments, an RX Operating Mode (RXOM) field, as defined in connection with the description of FIGS. 4A and 4B, may be included in the MAC header of the first communication frame. The RXOM field of the first communication frame may include the first configuration information. The first communication frame may further include an indication that the first configuration information includes a notice from the wireless device that the receiver will be configured according to the first configuration. For example, an RXMR subfield of the RXOM field may constitute the indication that the first configuration information includes a notice from the wireless device that the receiver will be configured according to the first configuration.

At 504, the wireless device may receive a first acknowledgement frame. The first acknowledgement frame may be configured according to a second configuration of the receiver. For example, the second configuration may be a current configuration of the receiver. The first acknowledgement frame may confirm the first configuration information. For example, the first acknowledgement frame may include the first configuration information, e.g., to confirm that it was received properly. The first configuration information may be confirmed in a header of the first acknowledgement frame. Specifically, the first configuration information may be confirmed in a MAC header of the first acknowledgement frame.

According to some embodiments, an RXOM field may be included in the MAC header of the first acknowledgement frame. The RXOM field of the first acknowledgement frame may confirm the first configuration information.

At 506, the wireless device may configure the receiver according to the first configuration. For example, the wireless device may configure the receiver to receive signals having a channel width not greater than the channel width indicated by the first configuration information, and having a number of spatial streams not greater than the number of spatial streams indicated by the first configuration information. The configuring the receiver may be in response to the receiving the first acknowledgement frame at 504.

At 508, the wireless device may receive a second communication frame after the configuring the receiver according to the first configuration at 506. The second communication frame may therefore be configured according to the first configuration. The second communication frame may include second configuration information specifying a third configuration of the receiver. The second configuration information may be included in a header of the second communication frame. Specifically, the second configuration information may be included in a MAC header of the second communication frame.

According to some embodiments, an RXOM field may be included in the MAC header of the second communication frame. The RXOM field of the second communication frame may include the second configuration information. The second communication frame may further include an indication that the second configuration information includes a request from a sender of the second communication frame that the receiver be configured according to the third configuration. For example, an RXMR subfield of the RXOM field may constitute the indication that the second configuration information includes a request from a sender of the second communication frame that the receiver be configured according to the third configuration.

At 510, the wireless device may transmit a second acknowledgement frame. The second acknowledgement frame may confirm the second configuration information. For example, the second acknowledgement frame may include the second configuration information, e.g., to confirm that it was received properly. The second configuration information may be confirmed in a header of the second acknowledgement frame. Specifically, the second configuration information may be confirmed in a MAC header of the second acknowledgement frame.

According to some embodiments, an RXOM field may be included in the MAC header of the second acknowledgement frame. The RXOM field of the second acknowledgement frame may confirm the second configuration information.

At 512, the wireless device may configure the receiver according to the third configuration. This may be in response to the receiving the second communication frame at 510.

At 514, the wireless device may receive a third communication frame after the configuring the receiver according to the third configuration at 512. The third communication frame may therefore be configured according to the third configuration.

As shown in FIG. 5B, at 522, a wireless device, such as the mobile device 106 or the AP 112, may receive a first communication frame. The first communication frame may include first configuration information specifying a first configuration of a receiver in a remote device. The remote device may also be a wireless device, such as the mobile device 106 or the AP 112. For example, the first configuration information may include at least one of an indication of a channel width of the receiver and an indication of a number of active receive spatial streams of the receiver. The first configuration information may be included in a header of the first communication frame. Specifically, the first configuration information may be included in a MAC header of the first communication frame.

According to some embodiments, an RXOM field, as defined in connection with the description of FIGS. 4A and 4B, may be included in the MAC header of the first communication frame. The RXOM field of the first communication frame may include the first configuration information. The first communication frame may further include an indication that the first configuration information includes a notice from the remote device that the receiver will be configured according to the first configuration. For example, an RXMR subfield of the RXOM field may constitute the indication that the first configuration information includes a notice from the remote device that the receiver will be configured according to the first configuration.

At 524, the wireless device may transmit a first acknowledgement frame. The first acknowledgement frame may be configured according to a second configuration of the receiver. Specifically, the first acknowledgement frame may be configured according to a format that is receivable by the remote device if the receiver of the remote device is configured according to the second configuration. For example, the second configuration may be a current configuration of the receiver. The first acknowledgement frame may confirm the first configuration information. For example, the first acknowledgement frame may include the first configuration information, e.g., to confirm that it was received properly. The first configuration information may be confirmed in a header of the first acknowledgement frame. Specifically, the first configuration information may be confirmed in a MAC header of the first acknowledgement frame.

According to some embodiments, an RXOM field may be included in the MAC header of the first acknowledgement frame. The RXOM field of the first acknowledgement frame may confirm the first configuration information.

At 528, the wireless device may transmit a second communication frame. The second communication frame may be configured according to the first configuration. Specifically, the second communication frame may be configured according to a format that is receivable by the remote device if the receiver of the remote device is configured according to the first configuration. The second communication frame may include second configuration information specifying a third configuration of the receiver. The second configuration information may be included in a header of the second communication frame. Specifically, the second configuration information may be included in a MAC header of the second communication frame.

According to some embodiments, an RXOM field may be included in the MAC header of the second communication frame. The RXOM field of the second communication frame may include the second configuration information. The second communication frame may further include an indication that the second configuration information includes a request from the wireless device that the receiver be configured according to the third configuration. For example, an RXMR subfield of the RXOM field may constitute the indication that the second configuration information includes a request from the wireless device that the receiver be configured according to the third configuration.

At 530, the wireless device may receive a second acknowledgement frame. The second acknowledgement frame may confirm the second configuration information. For example, the second acknowledgement frame may include the second configuration information, e.g., to confirm that it was received properly. The second configuration information may be confirmed in a header of the second acknowledgement frame. Specifically, the second configuration information may be confirmed in a MAC header of the second acknowledgement frame.

According to some embodiments, an RXOM field may be included in the MAC header of the second acknowledgement frame. The RXOM field of the second acknowledgement frame may confirm the second configuration information.

At 534, the wireless device may transmit a third communication frame. The third communication frame may be configured according to the third configuration. Specifically, the third communication frame may be configured according to a format that is receivable by the remote device if the receiver of the remote device is configured according to the third configuration.

Figure 6:
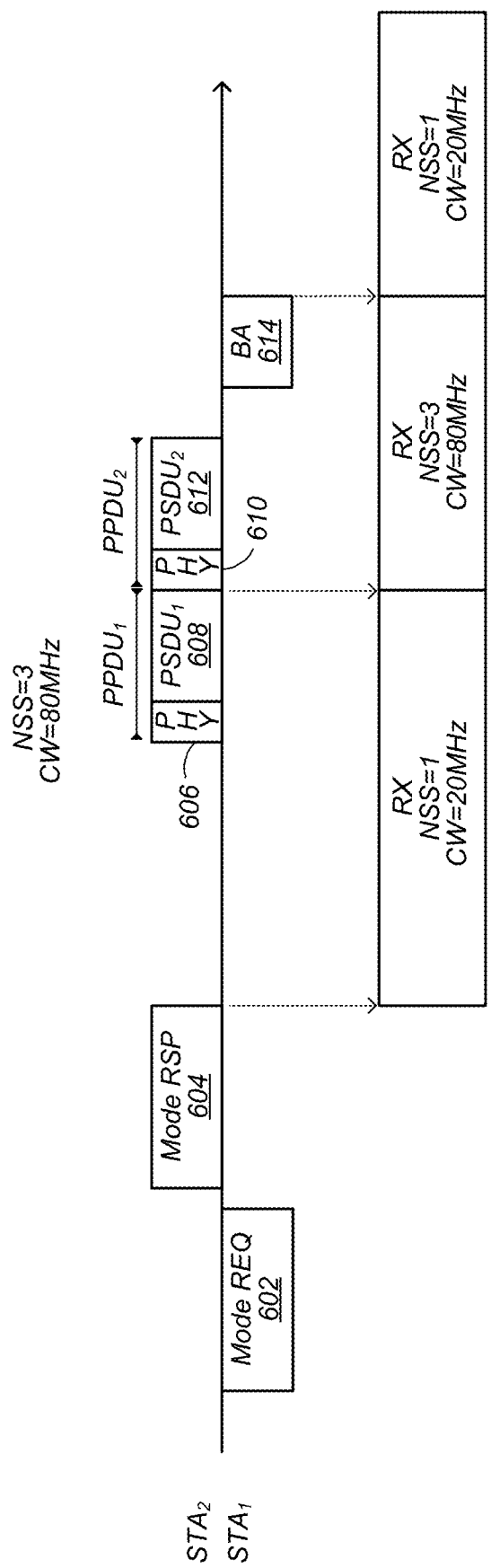
FIG. 6 illustrates a timeline demonstrating use by a wireless device of configuration information for instructing a configuration of a receiver of a remote device, according to some scenarios.

FIG. 6—Transmitter-Initiated Receiver Configuration

FIG. 6 illustrates a timeline demonstrating use by a wireless device of configuration information for instructing a configuration of a receiver of a remote device, according to some scenarios. FIG. 6 demonstrates possible behavior of two wireless stations ($STA_1$ and $STA_2$), as time progresses from left to right. A current state of $STA_1$ is shown below the timeline. It should be appreciated that the timeline of FIG. 6 includes only details relevant to the explanation of the present embodiment, and may omit other details. For example, in some scenarios, $STA_1$ may transition at various times to other states, such as a Listen state, which are not illustrated in FIG. 6.

Although the two wireless stations are discussed herein as client stations, this is not intended to be limiting, and it should be understood that the illustrated timeline may instead involve communications between other wireless stations, such as between a client station and an AP. For example, the illustrated timeline may be implemented in an identical fashion with an AP in place of $STA_1$ and/or $STA_2$. For example, the illustrated procedures may be implemented by two devices including one or more of the mobile device 106 and the access point 112.

As shown in FIG. 6, $STA_1$ may transmit to $STA_2$ a mode request frame 602. The mode request frame 602 may indicate that $STA_1$ desires to enter a configuration control mode in which $STA_2$ may define a configuration of a receiver of $STA_1$. In some scenarios, the mode request frame 602 may include information regarding the capabilities of the receiver, such as a maximum channel width and/or maximum number of spatial streams that may be supported by the receiver. The mode request frame 602 may further include configuration information regarding an initial or current configuration of the receiver. For example, the configuration information may include an indication of a channel width and/or an indication of a number of spatial streams. In such an example, the configuration information may indicate that the receiver of $STA_1$ is configured so as to receive signals having a channel width not greater than the indicated channel width and having a number of spatial streams not greater than the indicated number of spatial streams.

In response to receiving the mode request frame 602, $STA_2$ may transmit a mode response frame 604. The mode response frame 604 may acknowledge that $STA_2$ is entering the configuration control mode. The mode response frame 604 may include configuration information regarding an initial configuration of the receiver, e.g. if such information was not provided by $STA_1$ in the mode request frame 602.

In other scenarios, the mode request frame 602 may be transmitted by $STA_2$ to $STA_1$, and the mode response frame 604 may be transmitted by $STA_1$ to $STA_2$. In either scenario, the timeline may proceed as illustrated following the transmission of the mode response frame 604.

After receiving the mode response frame 604, $STA_1$ may transition to an RX state with its receiver configured according to an initial configuration, e.g., as identified in the mode request message 602 or the mode response message 604. If the mode response message 604 includes configuration information regarding the initial configuration of the receiver, then $STA_1$ may configure its receiver according to the specified initial configuration. As illustrated in the example of FIG. 6, the receiver is initially configured to receive signals having a channel width not greater than 20 MHz and having a number of spatial streams not greater than 1. In some scenarios, this configuration may represent a configuration of minimum power consumption.

While $STA_1$ is configured according to the initial configuration, $STA_2$ may transmit an aggregated Physical Layer Convergence Protocol (PLCP) protocol data unit (PPDU). The aggregated PPDU (A-PPDU) may include a plurality of back-to-back physical layer (PHY) packets. Specifically, the A-PPDU may include a plurality of back-to-back PPDU packets, such as $PPDU_1$ and $PPDU_2$, as illustrated. Each PPDU packet may include a PLCP Service Data Unit (PSDU) and a PHY header. For example, $PPDU_1$ is illustrated as including a PHY header 606 and a PSDU 608. Similarly, $PPDU_2$ is illustrated as including a PHY header 610 and a PDSU 612.

$PPDU_1$ may be configured to accommodate the configuration of the receiver of $STA_1$ according to the initial configuration. Specifically, according to the example of FIG. 6, $PPDU_1$ may have a channel width not greater than 20 MHz and may have no more than 1 spatial stream.

However, $STA_2$ may prefer that the receiver of $STA_1$ be configured according to a different configuration. For example, $STA_2$ may prefer that the receiver of $STA_1$ be configured to accommodate a greater channel width and/or a larger number of spatial streams, e.g., if $STA_2$ has a large volume of data to transmit to $STA_1$. Thus, there may be a discrepancy between the current configuration of the receiver of $STA_1$ and a different configuration preferred by $STA_2$.

To resolve this discrepancy, the PHY header 606 of $PPDU_1$ may include configuration information specifying the different configuration. For example, while $STA_1$ and $STA_2$ are in the configuration control mode, the configuration information included in the PHY header 606 may constitute an instruction to $STA_1$ to configure its receiver according to the different configuration.

As illustrated in the example of FIG. 6, the PHY header 606 includes configuration information including an indication of a channel width of 80 MHz and an indication of a number of spatial streams of 3.

In response to receiving the PHY header 606, $STA_1$ may configure its receiver according to the different configuration. As illustrated in the example of FIG. 6, the receiver of STA₁ is configured to receive signals having a channel width not greater than 80 MHz and having a number of spatial streams not greater than 3.

However, STA₁ may not have sufficient time to configure its receiver before receiving the PSDU 608 of PPDU₁. Therefore, all of PPDU₁ may be configured to accommodate the configuration of the receiver of STA₁ according to the initial configuration (e.g., having only 1 spatial stream and a channel width not greater than 20 MHz). Thus STA₁ may have until the beginning of PPDU₂ to configure its receiver according to the different configuration specified by the PHY header 606.

PPDU₂ may be configured to accommodate the configuration of the receiver of STA₁ according to the different configuration specified by the PHY header 606. Specifically, according to the example of FIG. 6, PPDU₂ may have a channel width not greater than 80 MHz and may have no more than 3 spatial streams. Any subsequent PPDUs (not shown) included in the A-PPDU may similarly be configured to accommodate this configuration of the receiver of STA₁. Alternatively, the PHY header 610 or a subsequent PHY header (not shown) may include new configuration information specifying a new configuration of the receiver of STA₁. In response to receiving the new configuration information, STA₁ may configure its receiver according to the new configuration.

In response to receiving the A-PPDU, STA₁ may transmit an acknowledgement frame, such as a block acknowledge (BA) frame 614. The BA frame 614 may in some scenarios include an indication of whether the configuration information included in the PHY header 606 was accepted or denied, such as an acceptance bit. In other scenarios, the transmission of the BA frame 614 may inherently indicate that the configuration information was accepted. Following transmission of the BA frame 614, STA₁ may configure its receiver to resume the initial configuration. In scenarios where the initial configuration represents a configuration of minimum power consumption, resuming the initial configuration may serve to conserve power while the receiver is not actively receiving an A-PPDU. The BA frame 614 may include configuration information specifying the initial configuration, to notify STA₂ that STA₁ intends to configure its receiver according to the initial configuration. For example, the configuration information included in the BA frame 614 may be included in a PHY header of the BA frame 614.

According to some scenarios, the configuration information included in the PHY header 606 or other PHY headers may include an RXNSS subfield and an RXCW subfield, similar to those discussed above in connection with FIGS. 4A and 4B. For example, the RXNSS subfield may indicate the maximum number of spatial streams to be received by the receiver. For example, the RXNSS subfield may be a 3-bit subfield indicating values 1-8. The RXCW subfield may indicate the channel width of the receiver. For example, the RXCW subfield may be a 3-bit subfield indicating a channel width of 20 MHz, 40 MHz, 80 MHz, or 160 MHz. If implemented as a subfield having 3 or more bits, the RXCW subfield may further be capable of indicating additional channel widths.

It should be appreciated that, although the RXNSS and RXCW subfields included in the PHY header 606 may be structurally and/or functionally similar to the subfields discussed in connection with FIGS. 4A and 4B, they may be distinct subfields. For example, the RXNSS and RXCW subfields discussed in connection with FIG. 6 may be located in a PHY header, while the RXNSS and RXCW subfields discussed in connection with FIGS. 4A and 4B may be located in a MAC header, as discussed above.

Additionally, it should be appreciated that portions of the methods illustrated and discussed in connection with FIGS. 4A and 4B may be used in conjunction with the method illustrated and discussed in connection with FIG. 6. For example, in the example of FIG. 6, a MAC header included in the PSDU 608 may include configuration information specifying a configuration according to which STA₂ intends to configure its receiver, in a manner similar to that described in connection with the data frame 406 of FIG. 4A. In such a scenario, STA₁ may confirm the configuration information included in the PSDU 608, e.g., by including the configuration information in the BA 614, in a manner similar to that described in connection with the acknowledgement frame 408 of FIG. 4A.

Figure 7:
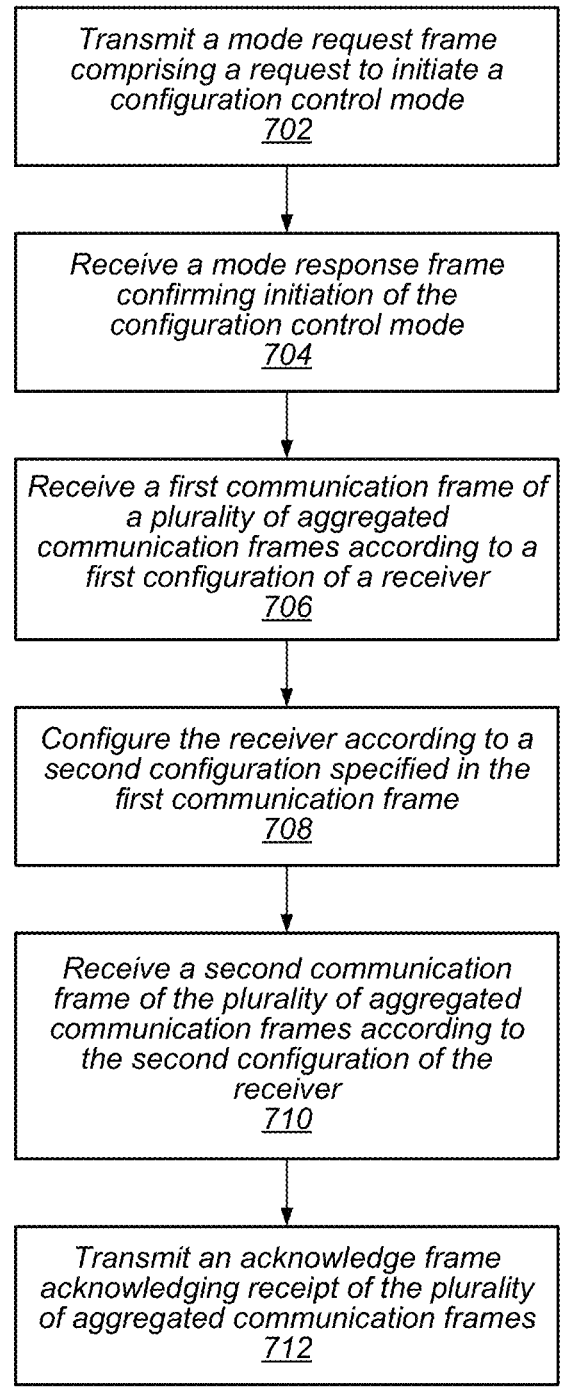
FIG. 7 is a flowchart diagram illustrating an exemplary method for reconfiguring a receiver in a wireless device, according to some scenarios.

FIG. 7—Method for Transmitter-Initiated Receiver Configuration

FIG. 7 is a flowchart diagram illustrating an exemplary method for reconfiguring a receiver in a wireless device, according to some scenarios. The method shown in FIG. 7 may be used in conjunction with any of the computer systems or devices shown in the above Figures, among other devices. If desired, it may be the case that the method is more particularly implemented by a wireless device, or, more specifically, by a WLAN/Wi-Fi chipset within a wireless device. Implementing some embodiments of the method of FIG. 7 may result in communications according to the timeline of FIG. 6. Some of the method elements shown may be performed concurrently or in a different order than shown, or may be omitted. Additional method elements may also be performed as desired. As shown, the method may operate as follows.

At 702, a wireless device, such as the mobile device 106 or the AP 112, may transmit a mode request frame. The mode request frame may include a request to initiate a configuration control mode. For example, the configuration control mode may allow a remote device (e.g., a remote wireless device, such as the mobile device 106 or the AP 112) to command the wireless device to configure a receiver of the wireless device according to a specified configuration.

At 704, the wireless device may receive a mode response frame. The mode response frame may confirm initiation of the configuration control mode. For example, the mode response frame may confirm that the remote device has entered the configuration control mode.

At 706, the wireless device may receive a first communication frame of a plurality of aggregated communication frames. The first communication frame may be configured according to a first configuration of the receiver. For example, the first configuration may be a current configuration of the receiver. The first communication frame may include first configuration information specifying a second configuration of the receiver. For example, the first configuration information may include at least one of an indication of a channel width of the receiver and an indication of a number of active receive spatial streams of the receiver. The first configuration information may be included in a header of the first communication frame. Specifically, the first configuration information may be included in a PHY header of the first communication frame. According to some embodiments, the first configuration information may include an RXCW subfield and an RXNSS subfield, as defined in connection with the description of FIG. 6.

At 708, the wireless device may configure the receiver according to the second configuration. For example, the wireless device may configure the receiver to receive signals having a channel width not greater than the channel width indicated by the first configuration information, and having a number of spatial streams not greater than the number of spatial streams indicated by the first configuration information. The configuring the receiver may be in response to the receiving the first communication frame at 706.

At 710, the wireless receiver may receive a second communication frame of the plurality of aggregated communication frames after the configuring the receiver according to the first configuration at 708. The second communication frame may therefore be configured according to the second configuration.

At 712, the wireless device may transmit an acknowledgement frame. The acknowledgement frame may include a block acknowledge (BA) frame. For example, the second acknowledgement frame may acknowledge receipt of the plurality of aggregated communication frames.

Example Embodiments

Some specific examples of the methods disclosed herein may be implemented as follows.

A method for reconfiguring a receiver in a wireless device may include the wireless device: receiving a data frame according to a first configuration of the receiver, the data frame having a first header including configuration information specifying a second configuration of the receiver; transmitting an acknowledgement of the data frame, the acknowledgement having a second header confirming the configuration information; reconfiguring the receiver according to the second configuration in response to the receiving the data frame; and receiving a subsequent data frame, after the reconfiguring, according to the second configuration. The configuration information may include at least one of an indication of a channel width of the receiver and an indication of a number of active receive spatial streams of the receiver.

A method of managing a wireless communication mode of a wireless device may include the wireless device: receiving a first data frame from a remote device, the first data frame including first configuration information specifying a first configuration of a receiver of the remote device; transmitting to the remote device a first acknowledgement frame according to a format that is receivable by the remote device if the receiver is configured according to a second configuration, wherein the first acknowledgement frame includes a confirmation of the first configuration information; and transmitting to the remote device a second data frame according to a format that is receivable by the remote device if the receiver is configured according to the first configuration, wherein the transmitting the second data frame occurs after the transmitting the first acknowledgement frame. The wireless device may be a mobile device. Alternatively, the wireless device may be an access point.

The first configuration information may include at least one of an indication of a channel width of the receiver and an indication of a number of active receive spatial streams of the receiver.

The first configuration information may be included in a header of the first data frame, and the confirmation of the first configuration information may be included in a header of the first acknowledgement frame. The header of the first data frame and the header of the first acknowledgement frame may include media access control (MAC) headers.

The second data frame may include second configuration information specifying a third configuration of the receiver. The method may then further include the wireless device: receiving a second acknowledgement frame confirming the second configuration information; and transmitting to the remote device a third data frame according to a format that is receivable by the remote device if the receiver is configured according to the third configuration, wherein the transmitting the third data frame occurs after the receiving the second acknowledgement frame. Each of the first configuration information and the second configuration information may include at least one of an indication of a channel width of the receiver and an indication of a number of active receive spatial streams of the receiver. The first data frame may further include an indication that the first configuration information includes a notice from the remote device that the receiver will be configured according to the first configuration; and the second data frame may further include an indication that the second configuration information includes a request from the wireless device that the receiver be configured according to the third configuration.

A method for reconfiguring a receiver in a wireless device may include the wireless device: receiving, according to a first configuration of the receiver, a first data frame of a plurality of aggregated data frames, the first data frame including first configuration information specifying a second configuration of the receiver; configuring the receiver according to the second configuration in response to the receiving the first data frame; and receiving, according to the second configuration of the receiver, a second data frame of the plurality of aggregated data frames. The first configuration information may include at least one of an indication of a channel width of the receiver and an indication of a number of active receive spatial streams of the receiver.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of managing a wireless communication mode of a wireless device, the method comprising:
receiving a first frame from a remote device, the first frame comprising first configuration information specifying a first configuration of a receiver of the remote device;
transmitting to the remote device an acknowledgement frame according to a second format that is receivable by the remote device when the receiver of the remote device is configured according to a second configuration; and
transmitting to the remote device, subsequent to transmitting the acknowledgement frame, a second frame according to a first format that is receivable by the remote device when the receiver of the remote device is configured according to the first configuration.

2. The method of claim 1, wherein the first configuration information comprises at least one of an indication of a channel width associated with the receiver of the remote device or an indication of a number of active receive spatial streams associated with the receiver of the remote device.

3. The method of claim 1, wherein the first configuration information is comprised in a header of the first frame, and wherein a header of the acknowledgement frame comprises a confirmation of the first configuration information.

4. The method of claim 3, wherein the header of the first frame and the header of the acknowledgement frame comprise media access control (MAC) headers.

5. The method of claim 1, wherein the second frame comprises second configuration information specifying a third configuration of the receiver of the remote device, the method further comprising:
receiving a second acknowledgement frame acknowledging the second configuration information; and
transmitting, to the remote device, a third frame according to a third format that is receivable by the remote device when the receiver of the remote device is configured according to the third configuration.

6. The method of claim 5, wherein the first configuration information and the second configuration information each comprise at least one of an indication of a receiver channel width or an indication of a number of active receive spatial streams associated with the receiver of the remote device.

7. The method of claim 6,
wherein the first frame further comprises an indication that the first configuration information comprises a notice from the remote device that the receiver of the remote device will be configured according to the first configuration; and
wherein the second frame further comprises an indication that the second configuration information comprises a request from the wireless device that the receiver of the remote device be configured according to the third configuration.

8. A apparatus comprising:
a memory storing program instructions; and
a processing element configured to execute the program instructions to:
receive a first frame from a remote device, the first frame comprising first configuration information specifying a first configuration of a receiver of the remote device;
provide for transmission to the remote device an acknowledgement frame according to a format that is receivable by the remote device when the receiver of the remote device is configured according to a second configuration; and
provide for transmission to the remote device, subsequent to transmitting the acknowledgement frame, a second frame according to a first format that is receivable by the remote device when the receiver of the remote device is configured according to the first configuration.

9. The apparatus of claim 8, wherein the first configuration information comprises at least one of an indication of a channel width associated with the receiver of the remote device or an indication of a number of active receive spatial streams associated with the receiver of the remote device.

10. The apparatus of claim 8, wherein the first configuration information is comprised in a header of the first frame, and wherein a header of the acknowledgement frame comprises a confirmation of the first configuration information.

11. The apparatus of claim 10, wherein the header of the first frame and the header of the acknowledgement frame comprise media access control (MAC) headers.

12. The apparatus of claim 8, wherein the second frame comprises second configuration information specifying a third configuration of the receiver of the remote device, wherein the processing element is configured to:
receive a second acknowledgement frame acknowledging the second configuration information; and
provide for transmission, to the remote device, a third frame according to a third format that is receivable by the remote device when the receiver of the remote device is configured according to the third configuration.

13. The apparatus of claim 12, wherein the first configuration information and the second configuration information each comprise at least one of an indication of a receiver channel width or an indication of a number of active receive spatial streams associated with the receiver of the remote device.

14. A method for reconfiguring a receiver of a wireless device, the method comprising:
transmitting a first frame comprising first configuration information specifying a first receiver configuration;
receiving an acknowledgement frame associated with a second receiver configuration;
configuring the receiver according to the first receiver configuration in response to the acknowledgement frame; and
receiving a second frame according to the first receiver configuration after configuring the receiver according to the first receiver configuration.

15. The method of claim 14, wherein the first configuration information comprises at least one of an indication of a channel width associated with the receiver or an indication of a number of active receive spatial streams associated with the receiver.

16. The method of claim 14, wherein the first configuration information is comprised in a header of the first frame, and wherein the first configuration information is acknowledged in a header of the acknowledgement frame.

17. The method of claim 16, wherein the header of the first frame and the header of the acknowledgement frame comprise media access control (MAC) headers.

18. The method of claim 14, wherein the second frame comprises second receiver configuration information specifying a third receiver configuration, the method further comprising:
- transmitting a second acknowledgement frame acknowledging the second configuration information;
- configuring the receiver according to the third configuration; and
- receiving a third frame according to the third receiver configuration, after configuring the receiver according to the third receiver configuration.

19. The method of claim 18, wherein the first configuration information and the second configuration information each comprise at least one of an indication of a channel width associated with the receiver or an indication of a number of active receive spatial streams associated with the receiver.

20. The method of claim 18,
- wherein the first frame further comprises an indication that the first configuration information comprises a notice from the wireless device that the receiver will be configured according to the first receiver configuration; and
- wherein the second frame further comprises an indication that the second configuration information comprises a request from a sender of the second frame that the receiver be configured according to the third receiver configuration.

* * * * *